United States Patent [19]

Labbe et al.

[11] 4,391,101
[45] Jul. 5, 1983

[54] ATTEMPERATOR-DEAERATOR CONDENSER

[75] Inventors: Donald E. Labbe, Woburn; Mayo E. Brown, Jr., Milton, both of Mass.

[73] Assignee: General Electric Company, Lynn, Mass.

[21] Appl. No.: 250,967

[22] Filed: Apr. 1, 1981

[51] Int. Cl.³ .............................................. F01K 21/06
[52] U.S. Cl. ...................................... 60/646; 60/653; 60/657
[58] Field of Search ................. 60/646, 653, 656, 657, 60/685

[56] References Cited

U.S. PATENT DOCUMENTS

| | | | |
|---|---|---|---|
| 3,009,325 | 11/1961 | Pirsh | 60/656 |
| 3,277,651 | 10/1966 | Augsburger | 60/657 |
| 3,286,466 | 11/1966 | Stevens | 60/105 |
| 3,392,712 | 7/1968 | Lustenader et al. | 122/459 |
| 3,496,724 | 2/1970 | Wilson | 60/105 |
| 4,208,882 | 6/1980 | Lopes et al. | 60/653 |
| 4,274,259 | 6/1981 | Silvestri, Jr. | 60/653 X |

*Primary Examiner*—Allen M. Ostrager
*Assistant Examiner*—Stephen F. Husar
*Attorney, Agent, or Firm*—James W. Mitchell

[57] ABSTRACT

A power plant may include a steam generator and a steam turbine wherein the steam generator provides steam to the turbine for driving the turbine and exhausted steam from the turbine is condensed in the turbine condenser to be pumped back to the steam generator as feedwater. In order to maintain minimum feedwater pump flows and to provide an alternative flow path should the steam generator require less than the available feedwater flow, a recirculation loop is provided for returning a portion of the feedwater to the turbine condenser. According to the present invention, this return flow to the condenser may be used for deaeration of condensate and for the attemperation of bypass steam.

6 Claims, 2 Drawing Figures

ATTEMPERATOR-DEAERATOR CONDENSER

BACKGROUND OF THE INVENTION

The United States Government has rights in this invention pursuant to Contract No. N00024-80-C-5348 with the Department of the Navy. This invention relates to steam turbine power plants and to a deaerating-desuperheating station at the condenser.

A power plant may include a steam generator and a steam turbine wherein the steam generator provides steam to the steam turbine for driving the steam turbine and exhausted steam from the steam turbine is condensed in the turbine condenser to be returned to the steam generator as feedwater. The steam generator is connected to the steam turbine through a main steam header and a bypass line is provided between the main steam header, upstream from the turbine throttle valves, and the turbine condenser for rapidly dumping steam directly to the condenser under certain startup or overspeed conditions.

A recirculation loop is provided downstream from the feedwater pump for returning a portion of the feedwater (condensate) to the condenser. This ensures minimum feedwater flows through the feedwater pump even if the feedwater demand generated by the boiler (steam generator) is less than the minimum required pump flow.

There is a necessity for providing a desuperheating or attemperating station in the steam bypass line, upstream from the condenser, so that steam which may be dumped into the condenser through the bypass line will be at a temperature which falls within acceptable temperature operating limits for the condenser. This avoids unnecessary thermal stresses in the condenser. One aspect of the present invention is to provide an attemperating station upstream from the condenser which would use the feedwater flow as part of the cooling medium. In mainline steam attemperation such as that shown in U.S. Pat. No. 4,208,882 to Lopes et al., assigned to the assignee of the present invention, a control system has been devised which regulates the supply of cooling fluid to the attemperator in accordance with certain demand criteria while avoiding water carryover into the steam turbine. The present invention differs in that an attemperation station is provided for the bypass line and the water injection is continuous while the steam supply which may need to be attemperated occurs basically at startup or in potential overspeed conditions. The continuous supply of attemperator water is the recirculation flow which may be sized to accommodate both pump requirements and attemperation requirements.

Another situation which is addressed by the present invention is a deaeration requirement for the feedwater. This condition is generally treated in a deaerator separate from the condenser and considered as an additional plant apparatus. However, in an effort to minimize and simplify various plant design criteria, the deaerator requirement is met in combination with the recirculation loop criteria. Since the condenser is normally at vacuum, the deaeration requirement is normally indigenous to startup. Deaeration is necessary to minimize corrosion in the boiler tubes. The present invention is dedicated to providing a deaeration function in combination with the recirculation loop and the attemperation station.

SUMMARY OF THE INVENTION

The present invention is carried out in one form by providing a desuperheating station or attemperator in a bypass steam line connected between the main steam header upstream from the throttle valves and the condenser. The water supply to the desuperheating station is sufficient to meet the attemperation requirements and is always available, thereby obviating any delay should a desuperheating emergency arise. The hardware necessary to accomplish this function comprises a desuperheating station upstream from the condenser properly sized so as to obviate the necessity of a control system and to provide for continuous operation.

The deaerating function is best carried out at a temperature slightly above the hotwell saturation temperature. Hence, a heater is incorporated into the feedwater recirculation line upstream from the desuperheating station for use when the deaeration function is desired. The feedwater is then circulated, heated so that it will flash at the outlet of the desuperheating station whereupon the vacuum pumps draw off the unwanted gases. The heater used may be any kind of heater known in the art and would be used to provide a temperature difference over the hotwell saturation temperature of about ten degrees Farenheit.

OBJECTS OF THE INVENTION

It is an object of the invention to provide a desuperheating station in a steam bypass line in combination with a feedwater recirculation loop.

It is another object of the invention to provide a deaerating station in combination with a feedwater recirculation loop.

It is another object of the invention to provide a combination deaerating/desuperheating station for a power plant in combination with a feedwater recirculation loop.

The novel features believed characteristic of the present invention are set forth in the appended claims. The invention itself, however, together with further objects and advantages thereof, may best be understood with reference to the following detailed description and examples.

DETAILED DESCRIPTION OF THE INVENTION

Figure 1:
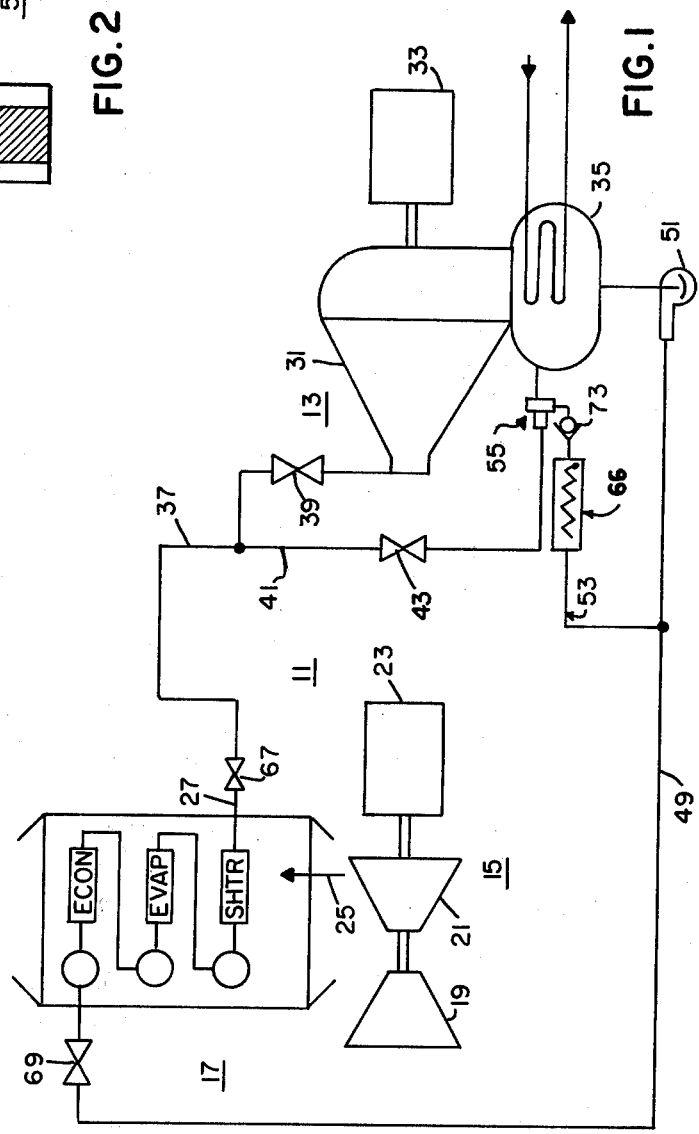
FIG. 1 is a schematic diagram of a combined cycle power plant which includes a feedwater recirculation loop and desuperheating/deaerating station in accordance with the present invention.

Referring to FIG. 1, a combined cycle power plant 11 is one example of an application for the present invention. A steam turbine power plant 13 is thermally connected to a gas turbine power plant 15 through a heat recovery steam generator 17. The gas turbine power plant includes a compressor 19 driven by a gas turbine 21 which also drives a load 23 which may, for example, be an electrical generator or gear set. A combustor (not shown) ignites a fuel/air mixture to provide motive fluid for the gas turbine.

The exhaust gas (arrow 25) from the gas turbine is used as a heat source for the heat recovery steam generator or boiler 17. As the hot exhaust gases ascend through the boiler, a counterflow heating arrangement takes place with turbine feedwater. The feedwater is heated in an economizer, evaporator and superheater in series order so that the highest temperature steam occurs in the superheater whereas the coolest gas occurs in the region of the economizer. The heat exchanger is a noncontact heat exchanger readily available in the art. The superheater output at outlet 27 is introduced into the steam turbine power plant 13.

The steam turbine power plant includes a steam turbine 31 which drives a load 33 which may be an electrical generator or gear set. The steam turbine also includes a condenser 35 for condensing exhaust steam from the steam turbine. The steam turbine is connected to the heat recovery steam generator through a main steam header pipe 37 connected to superheater outlet 27, which includes a valve 39 representing those valves indigenous to turbine control, including stop valves and throttle valves. A bypass steam line 41 branches from the main steam header 37 at a point upstream from turbine valves 39 (only one shown) and connects the steam generator directly to the turbine condenser through bypass control valve 43. Feedwater is conducted to the heat recovery steam generator through feedwater supply pipe 49 which includes feedwater pump 51.

The operation of the combined cycle power plant thus far described includes operation by the gas turbine whereupon the gas turbine exhaust gas is used to heat water in the heat recovery steam generator 17.

The superheater output of the heat recovery steam generator is piped to either the steam turbine 31 or condenser 35 whereupon the condensate is pumped through feedwater supply pipe 49 back to the heat recovery steam generator.

A recirculation loop 53 is provided between the feedwater supply line and the condenser for recirculating a portion of the feedwater supply back to the condenser. One reason for the recirculation is to provide an adequate feedback flowpath for pumped feedwater used to satisfy minimum pump flow requirements which may exceed feedwater demands from the heat recovery steam generator. It has been found that approximately a twenty-five percent recirculation of the total feedwater flow will typically satisfy minimum pump flows and this may be implemented by correctly sizing the flow nozzle in the desuperheater yet to be described.

Figure 2:
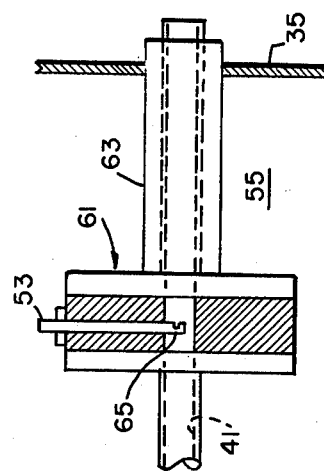
FIG. 2 is a detailed view of the desuperheater/deaerating apparatus.

According to the present invention and referring to FIG. 2, the recirculated feedwater may be advantageously input into a desuperheater or attemperator 55 where it is combined with any intermittant outflow of the bypass pipe 41. In this manner, and in accordance with the present invention, a source of attemperating fluid is always available for any steam which is dumped through bypass line 41. Any type of water-steam attemperator may be utilized. However, one example shown in FIG. 2 discloses a junction fitting 61 which interconnects steam pipe 41 and water pipe 53, whereas the steam pipe 41 is continued along a mixing length pipe 63 whereupon it is attached to the wall of the condenser 35. The inner termination of pipe 53 may be formed with a sprayer or nozzle 65 to aid in the flow regulation and mixing process for attemperation.

In addition to the foregoing, another desirable process indigenous to power plant operation is deaeration. This is sometimes carried out in the conventional power plant in a vessel called a deaerator. However, one object of the design which has provided motivation for the present invention is that it be as compact and simple as possible. Deaeration is desirable under low flow or startup conditions. Particularly during startup prior to generation of steam, the pump 51 is used to recirculate feedwater as vacuum is drawn on the condenser. However, it is desirable to flash the recirculated water as it is discharged back into the condenser. To implement this flashing action, it becomes necessary to heat water to a temperature slightly above saturation. A heater 66 is introduced into the recirculation line 53 in order to produce the necessary energy to flash. The heater could be of the electrical resistance type. An empirical example is that the heater may raise the water temperature some ten degrees Farenheit above the hotwell temperature in order to effect flashing and, hence, deaeration. Valves 67 and 69 are isolation valves for the heat recovery steam generator, whereas valve 73 is a nonreturn valve from the condenser.

Operation

The invention, in general, has two modes of operation. During turbine startup and other low flow conditions, the heater 66 is energized in order to heat recirculation feedwater to a valve slightly above the condenser hotwell saturation temperature. This results in flashing as the recirculation fluid is deposited back into the condenser with the resulting deaeration effect. After deaeration is complete, the heater may be shut off.

Under conditions such as overspeed or loss of load, it becomes necessary to shut down turbine admission or throttle valves 39 and to bypass the heat recovery steam generator output directly into the condenser. In order to avoid a mismatch between the acceptable condenser temperature and the boiler steam output temperature, the continuously available recirculation flow will be sufficient to provide attemperation to the incoming steam.

While there has been shown what is considered, at present, to be a preferred embodiment of the invention, other modifications may occur to those skilled in the art; and it is intended to cover in the appended claims all such modifications as fall within the true spirit and scope of the invention.

What is claimed is:

1. In an improved power plant of the type having a steam generator providing steam to a steam turbine, said steam turbine exhausting into a condenser for condensing exhaust steam into feedwater for the steam generator; means for pumping feedwater from the condenser to the steam generator, said steam generator connected to said steam turbine and condenser through a main steam header and a bypass line respectively; and, wherein the improvement comprises:

a recirculation loop for recirculating a portion of said feedwater into the condenser;
   means for heating said feedwater upstream from said condenser whereby said feedwater is slightly above saturation temperature; and,
   nozzle means for delivering said heated feedwater into said condenser whereby flashing is effected for deaeration purposes.

2. In an improved power plant of the type having a steam generator providing steam to a steam turbine, said steam turbine including a condenser for converting exhaust steam into feedwater for the steam generator; said steam generator connected to said steam turbine and condenser through a main steam header and a bypass line respectively, wherein the improvement comprises:
- a recirculation loop for conducting a portion of said feedwater back to said condenser;
- a heater in said recirculation loop for heating said feedwater upstream from said condenser; and,
- an attemperator in the bypass line through which feedwater is injected into said condenser.

3. In an improved power plant of the type having a steam generator providing steam to a steam turbine, said steam turbine exhausting into a condenser for condensing exhaust steam into feedwater for the steam generator; means for pumping feedwater from the condenser to the steam generator, said steam generator connected to said steam turbine and condenser through a main steam header and a bypass line respectively; and, wherein the improvement comprises:
- a recirculation loop for conducting a portion of said feedwater to said condenser;
- a heater in said recirculation loop for heating said feedwater portion upstream from said condenser; and,
- an attemperator connected to said bypass line and said recirculation loop whereby during deaeration operation the heater is on and no bypass steam is flowing through said attemperator whereas during attemperation operation the heater may be off and bypass steam is flowing through said attemperator.

4. The improvement recited in claim 3 wherein the feedwater portion is always flowing through said attemperator to ensure minimum pump flows.

5. A power plant comprising:
- a steam generator providing steam to a steam turbine, said steam turbine exhausting steam into a steam condenser whereby said steam exhaust is returned to feedwater;
- at least one pump connected to the condenser for pumping feedwater to the steam generator;
- a main steam header interconnecting the outlet end of the steam generator with the inlet end of the steam turbine;
- a bypass line interconnecting the main steam header and the condenser and including an inline steam attemperator;
- a recirculation loop connected downstream from said feedwater pump for diverting a portion of said feedwater back to the condenser; and,
- an inline heater in said recirculation loop upstream from said condenser, said attemperator interconnecting the bypass with the recirculation loop whereby feedwater is continuously delivered to said condenser through said attemperator.

6. A method of operating a power plant of the type comprising a steam generator providing steam to a steam turbine, said steam turbine exhausting steam into a steam condenser whereby said steam exhaust is returned to feedwater and at least one pump connected to said condenser for pumping feedwater to the steam generator; a main steam header interconnecting the steam generator and the steam turbine; a bypass steam line interconnecting the main steam header and the turbine condenser; a recirculation loop connected to the outlet side of the feedwater pump for diverting a feedwater portion to the condenser; an attemperator in the bypass line and a feedwater heater in the recirculation loop said recirculation loop connected at its downstream end into the attemperator, wherein said method comprises the step of:
- pumping said recirculation loop feedwater portion through said heater and into said attemperature for discharge into said condenser;
- energizing said heater during low flow conditions for deaerating said recirculation feedwater portion;
- de-energizing said heater during bypass line operation for attemperating said bypass steam flow into the condenser.

* * * * *